(12) United States Patent
Lee

(10) Patent No.: US 12,110,921 B2
(45) Date of Patent: Oct. 8, 2024

(54) ULTRA-LOW PROFILE AEROSTATIC BEARING AND THE METHOD OF MANUFACTURING THE SAME

(71) Applicant: AKRIBIS SYSTEMS PTE LTD, Singapore (SG)

(72) Inventor: Shien Yang Lee, Singapore (SG)

(73) Assignee: AKRIBIS SYSTEMS PTE LTD, Singapore (SG)

( * ) Notice: Subject to any disclaimer, the term of this patent is extended or adjusted under 35 U.S.C. 154(b) by 0 days.

(21) Appl. No.: 17/642,047

(22) PCT Filed: Jul. 13, 2020

(86) PCT No.: PCT/SG2020/050402
§ 371 (c)(1),
(2) Date: Mar. 10, 2022

(87) PCT Pub. No.: WO2021/112759
PCT Pub. Date: Jun. 10, 2021

(65) Prior Publication Data
US 2024/0044364 A1    Feb. 8, 2024

(30) Foreign Application Priority Data

Dec. 7, 2019  (SG) ............................ 10201911803U

(51) Int. Cl.
F16C 29/02  (2006.01)
F16C 32/06  (2006.01)
F16C 33/20  (2006.01)

(52) U.S. Cl.
CPC ........ *F16C 29/025* (2013.01); *F16C 32/0622* (2013.01); *F16C 33/208* (2013.01); *F16B 2200/79* (2023.08); *F16C 2220/04* (2013.01)

(58) Field of Classification Search
CPC .... F16C 29/025; F16C 32/06; F16C 32/0614; F16C 32/0622; F16C 33/208; F16C 2220/04
See application file for complete search history.

(56) References Cited

U.S. PATENT DOCUMENTS

2006/0049700 A1* 3/2006 Moriyama .......... G03F 7/70758
                                                      310/12.06
2012/0301060 A1* 11/2012 Uchimura .......... F16C 32/0614
                                                      384/12
2022/0278600 A1* 9/2022 Lee ......................... H02K 5/16

* cited by examiner

*Primary Examiner* — Alan B Waits
(74) *Attorney, Agent, or Firm* — WPAT, P.C

(57) ABSTRACT

An ultra-low profile aerostatic bearing and the method of manufacturing the same is disclosed. The aerostatic bearing comprises a substrate as a bearing housing, a hypodermic tubing and a plurality of orifices on the tubing. The method of manufacturing the aerostatic bearing includes the steps of forming the bearing housing and the hypodermic tubing and bonding the hypodermic tubing and the substrate together, and applying an encapsulation substance that encases the hypodermic tubing network and covers the substrate surface to obtain geometric accuracy and surface finish of the bearing surface by replicating the geometry and surface finish of a molding master.

22 Claims, 6 Drawing Sheets

ULTRA-LOW PROFILE AEROSTATIC BEARING AND THE METHOD OF MANUFACTURING THE SAME

CROSS REFERENCE TO RELATED APPLICATIONS

This patent application claims the benefit of Singapore Provisional Application No. 10201911803U filed Dec. 7, 2019, the entire contents of which are hereby incorporated by reference.

BACKGROUND OF THE INVENTION

1. Field of the Invention

The present invention relates to aerostatic bearing, and in particular, an ultra-low-profile aerostatic bearing and a method of manufacturing the same.

2. Background of the Invention

Aerostatic bearings are a class of non-contact bearings that generate a film of pressurized air or other gas by supplying the gas under external pressurization. The pressurized gas film acts as a lubrication layer that separates the bearing surface from the mating element of the bearing surface, and allows for relative motion with no stiction and minimal viscous friction. Aerostatic bearings generally incorporate compensating elements that control flow into the gas film and confer stiffness to the aerostatic bearing. That is, external forces which act to alter the thickness of the lubricating gas film in a properly designed aerostatic bearing induce changes to the pressure distribution in the gas film which generates a restoring force acting to resist the external force.

Aerostatic bearings may be classified according to the type of compensating element they use. Types of compensating elements include porous media, orifices, capillaries, microchannels, etc. A majority of aerostatic bearing compensating elements work by introducing a flow restriction at the inlet(s) to the lubricating gas film. Since the performance of aerostatic bearings is sensitive to the characteristics of these inlet restrictions, repeatable and economical production of these inlet restriction features and the methods of distributing pressurized gas to the inlet restrictors have been an area of active work with a substantial amount of prior art.

U.S. Pat. No. 5,564,063A, and European Patent No. EP0237627A2 teach that an orifice-compensated aerostatic bearing may be realized by plastically deforming a porous sintered material to produce a surface region of increased flow resistance and subsequently drilling through this increased-resistance layer with a laser beam to form restricting orifices. This method results in aerostatic bearings of substantial thickness (millimeter-scale due to minimum feasible thickness of porous sintered layer). EP0578130B1 teaches a method of producing aerostatic bearings at the microscale using monocrystalline silicone etched anisotropically. This method results in costs that scale rapidly as bearing size increases due to high material and process costs associated with the silicon-based photolithography process. U.S. Pat. No. 6,164,827A discloses an aerostatic bearing design that uses microchannels as the inlet restrictive element without disclosing the gas distribution system used to connect the microchannels to the external source of pressurized gas. U.S. Pat. No. 9,624,981 B2 discloses a design for the pressurized gas distribution system in aerostatic bearings that makes use of a recessed and grooved housing element along with a composite cover through which orifices are machined with a laser beam. The recesses and grooves in the housing element act to distribute pressurized gas to the laser-machined orifices. This design also results in bearings of larger thickness than can be achieved using the presently disclosed design due to the need to accommodate recesses and grooves in the housing element, in addition to the thickness of the composite cover.

European Patent No. EP0708262A1 discloses a method for producing an aerostatic bearing with a plurality of microholes as nozzles, characterized in that the material thickness in the region of the microholes is made so thin that the microholes in this region by means of a laser beam from the rear of the bearing surface are introduced, and that the bearing surface is machined to the required shape and surface tolerance before the holes are introduced. This design requires line-of-sight access be provided to the microhole region from the rear of the bearing housing element, imposing substantial complexity and cost in the design and fabrication of the housing element.

U.S. Pat. No. 9,739,305 B2 discloses an aerostatic bearing comprising a base having a foundation layer and a plurality of protruding bodies protruding from the foundation layer; and a sealing layer covering the foundation layer and revealing a revealed surface of at least one of the protruding bodies, wherein at least two of the protruding bodies are spaced apart from each other by the sealing layer, and at least two of the protruding bodies have different heights, and the tallest one of the revealed surface of the protruding bodies is exposed out of the sealing layer.

SUMMARY OF THE INVENTION

The present invention relates to an ultra-low profile aerostatic bearing and the method of manufacturing the same. The invention is applicable to orifice-compensated, inherently compensated, capillary-compensated, and microchannel-compensated aerostatic bearings, as aerostatic bearings utilising a combination of these methods of flow compensation.

The disclosed invention concerns a method of manufacturing ultra-low profile aerostatic bearings, wherein aerostatic bearing is a design of a gas distribution system to supply externally pressurized gas from a source (e.g. regulated output from a compressor) to the inlet flow restricting device, and the method of manufacturing the aerostatic bearing design is proposed. In accordance with the present invention a small diameter tubing (in sizes known in the trade as "hypodermic tubing", with an external diameter ranging from 0.1 mm to 3 mm) made of a metallic material is fixed to the surface of a substrate material. In a single aerostatic bearing, one or more lengths of the hypodermic tubing may be applied to the substrate surface. The internal volumes of the lengths of tubing are connected together such that they are in fluidic communication and the one or more lengths of hypodermic tubing form a pressurized gas distribution system across the surface of the aerostatic bearing. The hypodermic tubing gas distribution network is terminated in one or more gas fittings which allow the distribution network to be connected to an external pressurized gas source.

A main object of the present invention is to provide a method of manufacturing an ultra-low profile air bearing comprising the steps of:
(i) providing a substrate as a bearing housing;

(ii) preparing a hypodermic tubing by forming the hypodermic tubing to a shape based on an aerostatic bearing design;

(iii) mounting the hypodermic tubing from step (ii) to the substrate, and making alignment of the hypodermic tubing with respect to the substrate;

(iv) positioning the substrate with the hypodermic tubing with respect to a molding master with an accurate geometry;

(v) injecting an encapsulating substance between the substrate and the molding master;

(vi) demolding the substrate from the molding master once the encapsulating substance solidifies, and the cured encapsulating substance forming a solid layer on the substrate; and (vii) machining a plurality of orifices on the hyperdermic tubing, thereby the ultra-low profile aerostatic bearing is obtained.

Yet still a further object of the present invention is to provide a method of manufacturing an ultra-low profile aerostatic bearing, wherein the orifices are being made at locations with respect to the aerostatic bearing design, and the size of the orifices is made according to the aerostatic bearing design.

Another main object of the present invention is to provide an ultra-low profile aerostatic bearing comprising a. a substrate having a planar surface;

b. a network of hypodermic tubing with at least one orifice and having an internal volume fixed to the surface of the substrate forming into a gas distribution system which supplies externally pressurized gas from a pressurized gas source, wherein one end of the hypodermic tubing is terminated with a gas fitting, and the internal volumes of the tubing are connected together to be in fluidic communication; and c. an encasement layer being formed from an encapsulating substance applied to the planar surface of the substrate such that the encapsulating substance completely encases the hypodermic tubing, wherein the encapsulating substance forms an adhesive bond with the network of the hypodermic tubing and the surface of the substrate.

It is an object of the present invention to provide a method of manufacturing an ultra-low profile aerostatic bearing, wherein the hypodermic tubing is formed into a network, and the tubing is provided with at least one orifice, and has an internal volume fixed to the surface of the substrate forming a gas distribution system which supplies externally pressurized gas from a pressurized gas source, wherein one or more ends of the hypodermic tubing network is terminated with a gas fitting, and the internal volumes of the tubing are connected together to be in fluidic communication.

Still another object of the present invention is to provide an ultra-low profile aerostatic bearing wherein a pressurized gas source is a compressor which is able to supply compressed air to the aerostatic bearing.

Yet another object of the present invention is to provide a method of manufacturing an ultra-low profile aerostatic bearing, wherein the diameter of the orifices is ranging from 1 micrometer to 300 micrometer and the outer diameter of the hypodermic tubing is ranging from 0.1 to 3 mm.

Another further object of the present invention is to provide a method of manufacturing an ultra-low profile aerostatic bearing, wherein the wall thickness of the hypodermic tubing is ranging from 0.01 mm to 0.5 mm, preferably ranging from 0.01 mm to 0.1 mm, and the overall thickness of the encasement layer is between 0.1 to 5 mm thick and the hypodermic tubing includes stainless steel, glass, ceramic, polymer, or composite.

Still a further object of the present invention is to provide a method of manufacturing an ultra-low profile aerostatic bearing, wherein the thickness from the surface of the substrate to the surface of the encasement layer is 0.25 mm to 0.5 mm.

Still yet another object of the present invention is to provide a method of manufacturing an ultra-low aerostatic bearing, wherein the encasement layer has a coverage thickness, measured from the highest point on the hypodermic tubing to the surface of the solidified encasement layer, of 0 to 1 mm thick.

Another further object of the present invention is to provide a method of manufacturing an ultra-low aerostatic bearing, wherein an adhesive is employed to bond the hypodermic tubing to the substrate.

Another further object of the present invention is to provide a method of manufacturing an ultra-low aerostatic bearing, wherein the encasement layer is created by applying an encapsulating substance in the liquid state and subsequently solidifying the substance to produce a solid encasement layer that replicates the geometry of the molding master.

Yet still a further object of the present invention to provide a method of manufacturing an ultra-low profile aerostatic bearing wherein the hypodermic tubing is made from a material comprises stainless steel, glass, ceramic, polymer or composite material.

A further object of the present invention is to provide a method of manufacturing an ultra-low profile aerostatic bearing, wherein the hypodermic tubing has a circular, rectangular or square cross section.

Still yet a further object of the present invention is to provide a method of manufacturing an ultra-low profile aerostatic bearing, further comprising the step of applying a mold releasing agent to the molding master prior to the injection of the encapsulating substance.

This and other objects of the invention, which will become apparent hereinafter, are achieved by providing a method of manufacturing ultra-low profile aerostatic bearing.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PRESENT INVENTION

Figure 1:
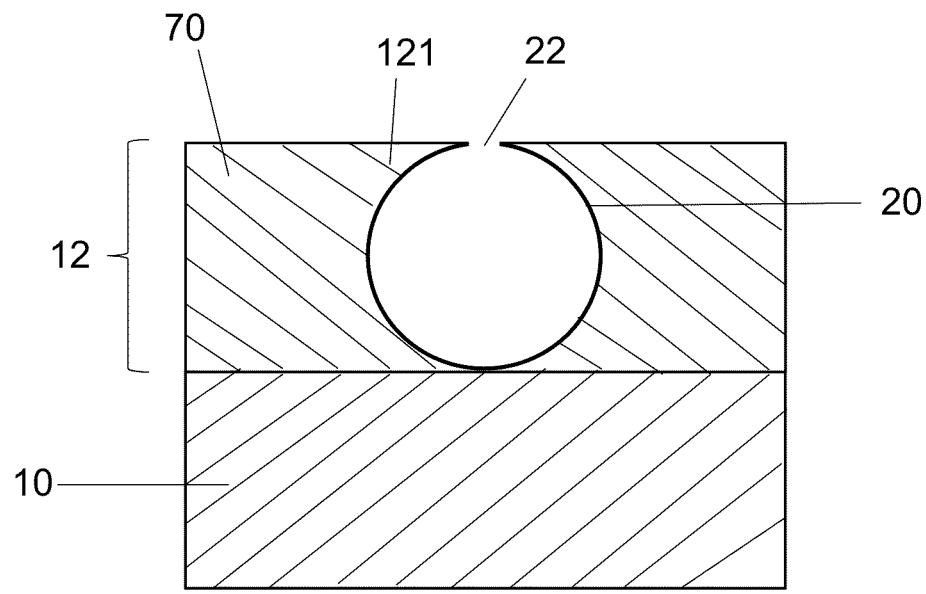
FIG. 1 shows a cross-section view of an ultra-low profile aerostatic bearing in accordance with the present invention.

The present invention will now be described in detail with reference to the accompanying drawings, wherein the same reference numerals will be used to identify the same or similar elements throughout the several views of the present invention.

With reference to FIG. 1, a cross-section view of an aerostatic bearing in accordance with a first embodiment of the present invention, comprises a substrate 10, an encasement layer 70 with an aerostatic bearing thickness 12 mounted on the top surface of the substrate 10, wherein the encasement layer 70 contains a hypodermic tubing 20 having a plurality of orifices 22. The substrate 10 is covered by the encasement layer 70, and the hypodermic tubing 20 is within the encasement layer 70 and is along the edge thereof. The plurality of orifices 22 faces the surface of the encasement layer 70 or the periphery 121. In other words, the orifices 22 are in fluid communication with the outside of the encasement layer 70. In accordance with the present invention, the hypodermic tubing 20 is arranged in a loop on the encasement layer 70. One end of the hypodermic tubing 20 is connected to a gas fitting 72 which is to be connected to a pressurized gas supply 80 in the course of operation of the aerostatic bearing.

Figure 2:
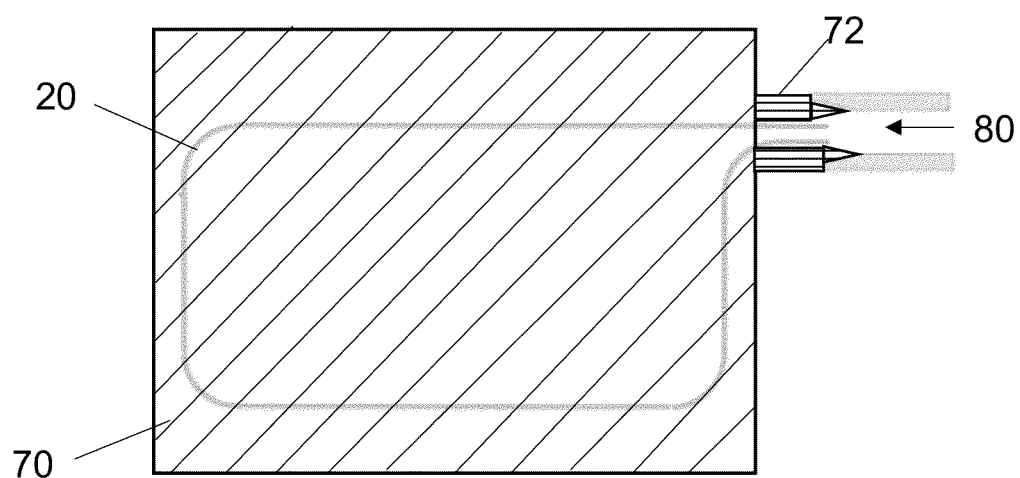
FIG. 2 is a plan view of the ultra-low profile aerostatic bearing in accordance with the present invention.

FIG. 2 is a plan view of the ultra-low profile aerostatic bearing in accordance with the present invention. As shown in the figure, the layout of the hypodermic tubing 20 is along the edge of the encasement layer 70, and the layout is a loop. The gas fitting 72 of the hypodermic tubing 20 is positioned at one lateral edge of the encasement layer 70, wherein the gas fitting 72 is connected to the pressurized gas supply 80 where a pressurized gas is employed to operate the aerostatic bearing.

Figure 3:
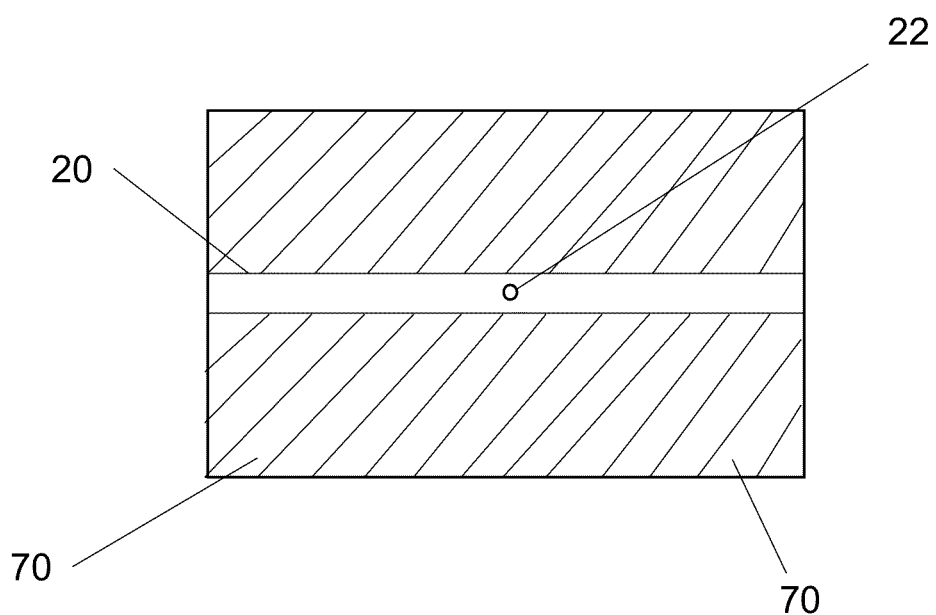
FIG. 3 schematically shows the orifice on the hypodermic tubing located on an encasement layer in accordance with the present invention.

FIG. 3 schematically shows the orifice on the hypodermic tubing 20 located on an encasement layer 70 in accordance with the present invention. On the encasement layer 70 of the aerostatic bearing, the hypodermic tubing 20 is located, and a plurality of orifices 22 are made on the hypodermic tubing 20 facing the exterior of the encasement layer 70. The orifices 22 on the hypodermic tubing 20 are formed by laser micromachining.

Figure 4:
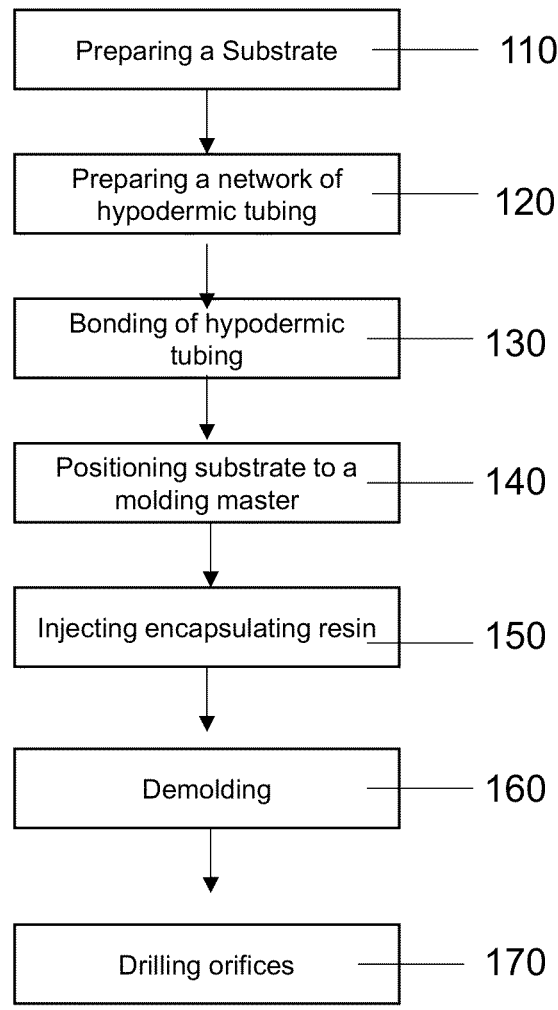
FIG. 4 is a manufacturing flow chart in accordance with a preferred embodiment of the present invention.

FIG. 4 is a manufacturing flow chart in accordance with a preferred embodiment of the present invention. First, a substrate 10 is being prepared in step 110. The substrate 10 can optionally be a dedicated bearing housing for a modular bearing, a part of a machine structure for an integrated bearing, or even a part of an ironcore linear motor forcer. In the next step 120, a hypodermic tubing 20 is employed and is shaped to that of a specific aerostatic bearing design. The third step 130 of the method of the present invention is to bond the preformed hypodermic tubing 20 onto the substrate 10, and an adhesive is used for the bonding. In another alternative, a jig is used to ensure a proper position on the substrate 10 is located and accurate alignment of the hypodermic tubing 20 with respect to the substrate 10.

Next step, step 140, is the positioning the substrate 10 together with the preformed and bonded hypodermic tubing 20 with respect to a molding master with accurate geometry. For a planar thrust bearing, a nominally flat surface with an appropriate geometric accuracy and surface finish is used. The next step is step 150. In this step 150, an encapsulating substance is injected between the substrate 10 and the molding master, and a mold releasing agent is applied to the molding master before the injection takes place. Once the encapsulating substance in step 150 has solidified, in step 160, the substrate 10 is demolded from the molding master. The solidified encapsulating substance forms a solid encasement layer on the substrate that replicates the geometric accuracy and the surface finish of the molding master. This is step 160 of the method of the present invention.

Next, a plurality of correct sizes of orifices and the exact location of the orifices 22 are formed by machining the hypodermic tubing 20 formed on the substrate 10 in accordance with the bearing design. The machining of the orifices 22 is done by using a laser device or the like.

In accordance with the preferred embodiment of the present invention, the method of manufacturing an ultra-low profile air bearing comprises the steps as follows:

(i) providing a substrate 10 as a bearing housing;
(ii) preparing a hypodermic tubing 20 by bending the hypodermic tubing 20 to a shape based on an air bearing design;
(iii) mounting the hypodermic tubing 20 formed in step (iii) to the substrate 10, and making alignment of the hypodermic tubing 20 with respect to the substrate 10;
(iv) positioning the substrate 10 with the bonded hypodermic tubing 20 with respect to a molding master with an accurate geometry;
(v) applying an encapsulating substance between the substrate 10 and the molding master;
(vi) demolding the substrate 10 from the molding master once the encapsulating substance solidifies, and the solidified encapsulating substance forming a solid encasement layer on the substrate 10; and
(vii) machining a plurality of orifices 22 using a laser based on the air bearing design.

In the preferred embodiment of the present invention, the orifices 22 are being made at locations on the hypodermic tubing 20 with respect to the air bearing design, and the orifices 22 are of a size according to the air bearing design.

The diameter of the orifices 22 on the hypodermic tubing 20 is ranging from 1 micro meter to 300 micro meter, and the outer diameter of the hypodermic tubing 20 is ranging from 0.1 to 3 mm. The wall thickness of the hypodermic tubing 20 is ranging from 0.01 mm to 0.5 mm, preferably ranging from 0.01 mm to 0.1 mm.

The overall thickness of the encapsulating resin/encasement layer 70 is between 0.1 to 5 mm thick, which measures from the substrate 10 surface to the cured encasement layer 70 surface, and the preferred overall thickness is 0.25 mm to 0.5 mm; and an encapsulating substance, such as an encapsulating resin, is used to form the encasement layer 70 to bond with the hypodermic tubing 20. In accordance with the present invention, the encasement layer 70 has a coverage thickness, which measured from the highest point on the hypodermic tubing 20 to the cured resin layer surface 70, of 0 to 1 mm thick. The adhesive that is employed to bond the hypodermic tubing 20 to the substrate 10 can be an epoxy-based structural adhesive, a UV-curing adhesive, a cyanoacrylate adhesive etc.

In the present invention, the hypodermic tubing 20 is made from material comprises stainless steel, glass, ceramic, polymer or composite material and the hypodermic tubing 20 has a circular, rectangular or square cross section and the hypodermic tubing 20 is strong enough to withstand the maximum working pressure of the pressurized gas.

In step (v) above, a mold releasing agent is applied to the molding master before injecting an encapsulating resin between the substrate 10 and the molding master.

In accordance with the preferred embodiment of the present invention, the present disclosed invention is applicable to orifice-compensated, inherently compensated, capillary-compensated, and microchannel-compensated aerostatic bearings, or the combinations thereof. A gas distribution system which supply externally pressurized gas from sources, for example, a regulated output from a compressor, to the inlet flow restricting device is disclosed.

In a single aerostatic bearing, one or more lengths of the hypodermic tubing 20 is applied to the surface of the substrate 10. The internal volumes of the lengths of the hypodermic tubing 20 are connected together such that the tubing 20 is in fluidic communication, and the one or more lengths of the hypodermic tubing 20 form a pressurized gas distribution system across the surface of the aerostatic bearing. The hypodermic tubing gas distribution network is terminated in one or more gas fittings 72 which allow the distribution network to be connected to an external pressurized gas source 80, as shown in FIG. 2.

In the case of a thrust aerostatic bearing, the substrate 10 has a nominally flat surface. However, other bearing surface configurations are possible depending on the degrees-of-freedom intended to be constrained, for example, a nominally cylindrical surface for a journal bearing. However, the geometric and dimensional tolerances of the substrate surface is substantially relaxed as the final bearing surface is formed in a later step. The relaxed tolerances lead to cost savings and enable the disclosed aerostatic bearing design to be realized directly on diverse substrates, for instance, moving carriage in a machine, for tight integration and maximal compactness. The hypodermic tubing 20 may optionally be fixed to the substrate 10 by an adhesive or other fixation method to preserve planar position or left loose.

Figure 5:
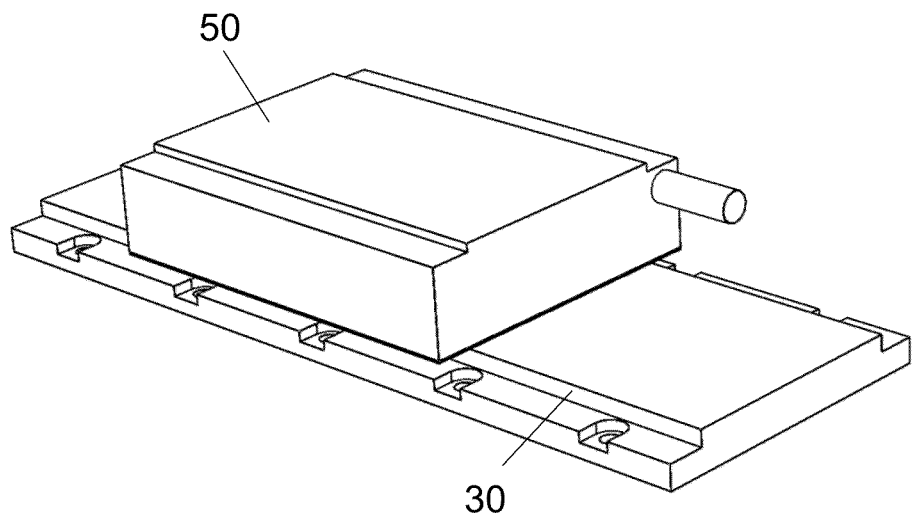
FIG. 5 is a perspective view showing an ironcore linear motor integrated with aerostatic bearing in accordance with the present invention.
Figure 6:
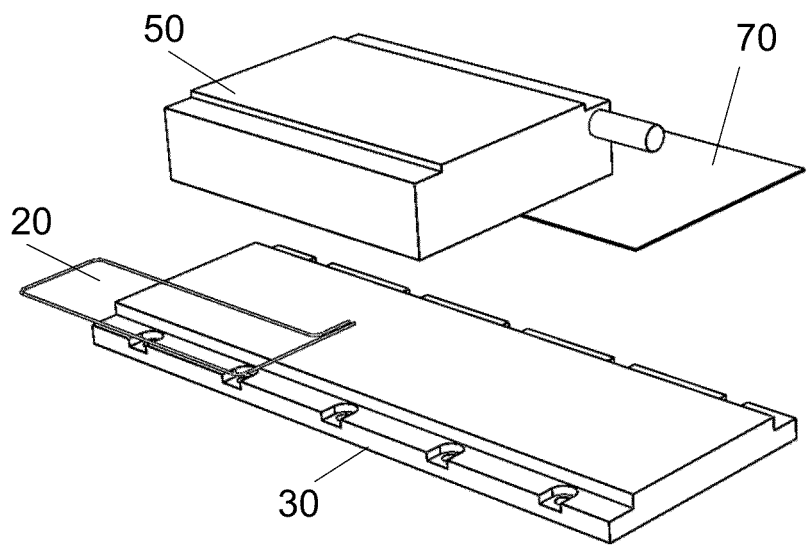
FIG. 6 is schematic view showing the manufacturing of aerostatic bearing in accordance with the present invention.

FIG. 5 is a perspective view showing an ironcore linear motor integrated with aerostatic bearing in accordance with the present invention and FIG. 6 is schematic view showing the manufacturing of aerostatic bearing in accordance with the present invention.

Referring to FIG. 5, there is shown an ironcore linear motor 50 incorporated with an aerostatic bearing of the present invention, wherein the ultra-low profile aerostatic bearing is positioned in between the linear motor forcer 50 and the linear motor stator 30.

As shown in FIG. 6, the encasement layer 70 bonded with the hypodermic tubing 20 is positioned in between the linear motor forcer 50 and the linear motor stator 30. The hypodermic tubing 20 is being formed as a gas distribution system in the aerostatic bearing of the present invention.

In accordance with the method of manufacturing the aerostatic bearing, an encasement compound is applied to the surface of the substrate 10 such that the encasement compound completely encases the hypodermic tubing 20 once cured to become the encasement layer 70, as shown in FIG. 1. The cured encasement compound ideally forms and adhesively bonds with both the network of hypodermic tubing 20 and the surface of the substrate 10. In a preferred embodiment, a replication master processed to have the appropriate form tolerances and surface roughness characteristics conducive to generating a high-performing aerostatic bearing is applied to the aerostatic bearing during the curing process of the encasement compound such that the encasement compound cures to form a precision surface suitable to serve directly as an aerostatic bearing surface without further processing.

In another embodiment, the cured encasement layer is further processed, such as through milling, turning, grinding, lapping, polishing, to achieve the appropriate surface form and roughness appropriate to the aerostatic bearing.

After the curing of the encasement compound, as well as any optional surface processing steps, at least one orifice 22 is machined by means of a directed high energy beam, for instance, laser beam, from the bearing surface through to the internal volume of the hypodermic tubing 20, as shown in FIG. 3. In another preferred embodiment, the drilling of the orifice 22 is carried out by mechanical means such as with a cutting implement. In yet another alternative embodiment, the orifice 22 is formed by chemical etching of the cured encasement layer and the hypodermic tubing wall. The orifices 22 thus formed between the external bearing surface and the internal volume of the hypodermic tubing 20 act to supply an externally pressurized gas to a lubricating gas film of the aerostatic bearing.

In accordance with the present invention, the use of hypodermic tubing 20 to form a pressurized gas distribution network is used to create gas bearings of lower profile. The presently disclosed invention gives the result in an aerostatic bearing with overall thickness equal to the outer diameter of the hypodermic tubing 20 used. Such a minimal thickness condition is realized when the structure to be guided by the aerostatic bearing (e.g. moving carriage in a machine tool) is used directly as the substrate, and the encasement compound is made to only just fully encase the hypodermic tubing network to form a bearing surface nominally tangent to the external surface of the hypodermic tubing 20.

The present invention relates to aerostatic bearings with a variety of compensation methods. In the preferred embodiment, the hypodermic tubing 20 is sized such that the cross-sectional area and the characteristic flow length results in an overall flow resistance substantially lower than the orifices 22 drilled through from the bearing surface to the internal volume of the hypodermic tubing 20. In this preferred embodiment, the primary flow restriction is at the drilled orifices 22 (pressure drop due to Bernoulli phenomenon), thereby leading to an orifice-compensated or inherently compensated aerostatic bearing. In another preferred embodiment, the network of the hypodermic tubing 20 can be sized to result in a pipe flow resistance (pressure drop due to Hagen-Poiseuille phenomenon) that is higher than the resistance across the orifice 22. This results in a capillary compensated aerostatic bearing that is preferred in some applications for its viscous flow characteristics. In yet another preferred embodiment, a plurality of microchannels are formed in the bearing surface either by replicating matching features in the molding master or by machining after curing. Both the network of the hypodermic tubing 20 and the orifices 22 are sized such that the dominant flow restriction is the microchannel network. This leads to a microchannel compensated aerostatic bearing. In yet another preferred embodiment, the hypodermic tubing 20, orifices 22, and any microchannels in the bearing surface are sized such that they act in combination to produce an aerostatic bearing with hybrid compensation.

Figure 7:
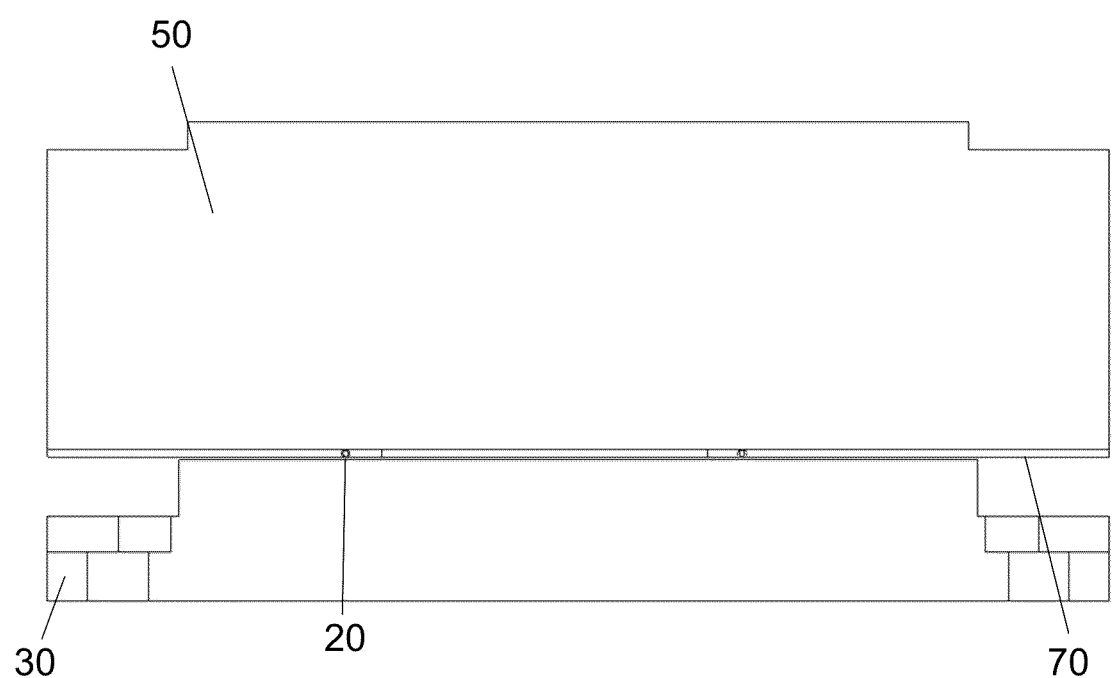
FIG. 7 schematically shows a cross section view of the linear motor forcer integrated with aerostatic bearing in accordance with the present invention.
Figure 8:
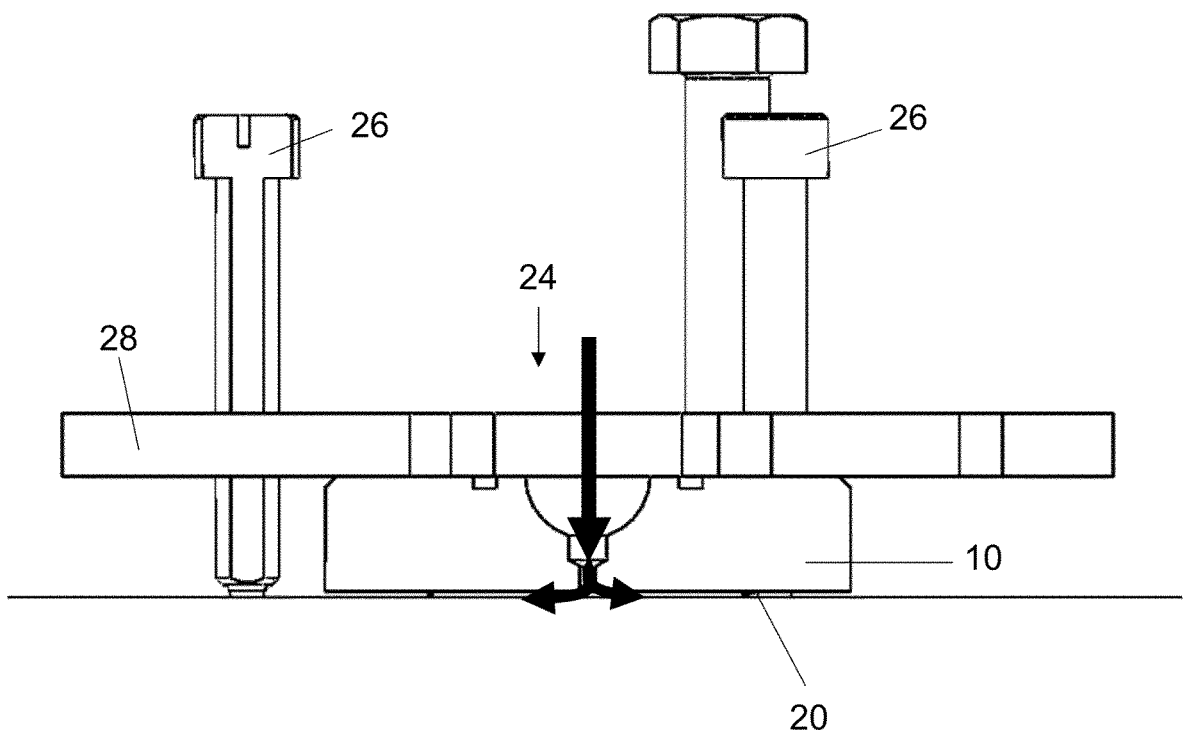
FIG. 8 is a sectional view showing encapsulating resin injection path to form an encasement layer in accordance with the present invention.

FIG. 7 schematically shows a cross section view of the linear motor forcer integrated with aerostatic bearing in accordance with the present invention, and FIG. 8 is a sectional view showing encapsulating resin injection path to form an encasement layer in accordance with the present invention. As shown in FIG. 7, the encasement layer 70 together with the network of the hypodermic tubing 20 is located in between a linear motor forcer 50 and a linear motor stator 30.

The preferred embodiment illustrated in the FIGS. 7 and 8 are a flat thrust aerostatic bearing. Aerostatic bearings of other types, including journal, spherical, and radial geometries can be realized using the presently disclosed design as alternate embodiments.

As shown in FIG. 8, an encapsulating substance such as encapsulating resin is injected along an injection path, shown with an arrow 24 on the substrate 10 so as to form a bond together with the preformed hypodermic tubing 20 on the substrate 10. The substrate 10 is securely fixed by using alignment screws 26 and a fixed plate 28 in the course of injection of the encapsulating substance and throughout part or all of the solidification process of the encapsulating substance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing an aerostatic bearing comprising the steps of:
   i. providing a substrate (20) being a housing for the aerostatic bearing;
   ii. preparing a hypodermic tubing and bending the hypodermic tubing to a shape based on a predetermined design;
   iii. mounting the hypodermic tubing (20) from step (ii) to the substrate (10), and making alignment of the hypodermic tubing (20) with respect to the substrate (10);
   iv. positioning the substrate (10) with the bonded hypodermic tubing (20) with respect to a molding master;
   v. injecting an encapsulating substance between the substrate (10) and the molding master;
   vi. demolding the substrate (10) from the molding master once the encapsulating substance cures, and the cured encapsulating substance forming a solid layer on the substrate (10) as an encasement layer (70); and
   vii. machining a plurality of orifices (22) on the hypodermic tubing (22), thereby the aerostatic bearing is obtained.

2. The method as recited in claim 1, wherein the hypodermic tubing (20) is fixed to the surface of the substrate (10) forming into a gas distribution system which supplies externally pressurized gas.

3. The method as recited in claim 2, wherein a pressurized gas source (80) provides pressurized gas to the hypodermic tubing (20).

4. The method as recited in claim 1, wherein the hypodermic tubing (20) is terminated with a gas fitting (72), and the hypodermic tubing (20) is for fluidic communication.

5. The method as recited in claim 1, wherein the orifices (22) are made at locations with respect to the aerostatic bearing design.

6. The method as recited in claim 1, wherein the orifices (22) is ranging from 1 micro meter to 300 micro meter in diameter.

7. The method as recited in claim 1, wherein a wall thickness of the hypodermic tubing (20) is ranging from 0.01 mm to 0.5 mm.

8. The method as recited in claim 1, wherein an overall thickness of the encapsulating substance is between 0.1 to 5 mm thick.

9. The method as recited in claim 1, wherein the overall thickness of the encapsulating substance is between 0.25 mm to 0.5 mm.

10. The method as recited in claim 1, wherein the encapsulating substance has a coverage thickness, which measured from the highest point on the hypodermic tubing (20) to the cured encapsulating substance layer surface, of 0 to 1 mm thick.

11. The method as recited in claim 1, wherein an adhesive is employed to bond the hypodermic tubing to the substrate.

12. The method as recited in claim 1, wherein the hypodermic tubing (20) is made from material comprising stainless steel, glass, ceramic, polymer, or composite material.

13. The method as recited in claim 1, wherein the hypodermic tubing (20) has a circular, rectangular, or square cross section.

14. The method as recited in claim 1, further comprising the step of applying a mold releasing agent to the molding master prior to the injection of the encapsulating substance.

15. An aerostatic bearing comprising
   a. a substrate (10) having a planar surface;
   b. a network of hypodermic tubing (20) with at least one orifice (22) and fixed to the surface of the substrate (10) forming into a gas distribution system which supplies externally pressurized gas from a pressurized gas source (80), wherein one end of the hypodermic tubing (20) is terminated with a gas fitting (72), and the tubing (20) is for fluidic communication; and
   c. an encasement layer (70) being formed from an encapsulating substance applied to the planar surface of the substrate (10) such that the encapsulating substance completely encases the hypodermic tubing (20), wherein the encapsulating substance forms an adhesive bond with the network of the hypodermic tubing (20) and the surface of the substrate (10).

16. The aerostatic bearing as recited in claim 15, wherein a diameter of the orifices is ranging from 1 micrometer to 300 micrometer.

17. The aerostatic bearing as recited in claim 15, wherein a wall thickness of the hypodermic tubing (20) is ranging from 0.01 mm to 0.5 mm.

18. The aerostatic bearing as recited in claim 15, wherein an overall thickness of the encasement layer (70) is between 0.1 to 5 mm.

19. The aerostatic bearing as recited in claim 15, wherein the overall thickness of the encasement layer (70) is 0.25 mm to 0.5 mm.

20. The aerostatic bearing as recited in claim 15, wherein the encasement layer (70) has a coverage thickness between 0 (tangential contact with the hypodermic tubing (20)) to 1 mm thick.

21. The aerostatic bearing as recited in claim 20, wherein the coverage thickness is measured from the highest point on the hypodermic tubing (20) to the surface of the encasement layer (70).

22. The aerostatic bearing as recited in claim 15, wherein the gas fitting (72) is connected to the pressurized gas source (80).

* * * * *